United States Patent
Powell

[11] Patent Number: 6,120,224
[45] Date of Patent: Sep. 19, 2000

[54] LOAD LOCK RACK

[76] Inventor: Bruce Powell, 1936 Moore Ave., St. Charles, Ill. 60174

[21] Appl. No.: 09/115,037

[22] Filed: Jul. 14, 1998

[51] Int. Cl.[7] .................................. B60P 7/08; B60P 7/12
[52] U.S. Cl. ............................... 410/36; 410/32; 410/42; 410/143; 410/151
[58] Field of Search .................................. 410/151, 143, 410/144, 145, 152, 32–36, 42; 211/60.1; 248/201, 312; 296/3; 224/405, 564; 206/443

[56] References Cited

U.S. PATENT DOCUMENTS

| | | | |
|---|---|---|---|
| 2,797,851 | 7/1957 | Leake . | |
| 3,767,253 | 10/1973 | Kluetsch | 410/151 X |
| 4,720,222 | 1/1988 | Nagy et al. | 410/151 |
| 4,723,880 | 2/1988 | Stumpf, Jr. | 410/143 |
| 5,405,226 | 4/1995 | Daves | 410/32 |
| 5,890,856 | 4/1999 | Huang | 410/151 |

Primary Examiner—Stephen T. Gordon
Attorney, Agent, or Firm—Marshall, O'Toole, Gerstein, Murray & Borun

[57] ABSTRACT

In order to provide a manner of supporting a load lock in a semi-trailer even during transport, a load lock rack kit includes a load lock rack comprising a generally planar shelf-like supporting surface having a front edge and a rear edge spaced therefrom and a pair of tie down fittings. The shelf-like supporting surface has at least one opening extending from the front edge to at least a point generally intermediate the front and rear edges to receive the shaft of the load lock wherein the opening is formed such that a bearing pad on at least one end of the shaft cannot pass through the opening. With this arrangement, the load lock rack also includes a plate for mounting the shelf-like supporting surface with the rear edge adjacent the side wall of the semi-trailer and a lip or angled surface to maintain the load lock on the load lock rack during transport of the semi-trailer.

6 Claims, 4 Drawing Sheets

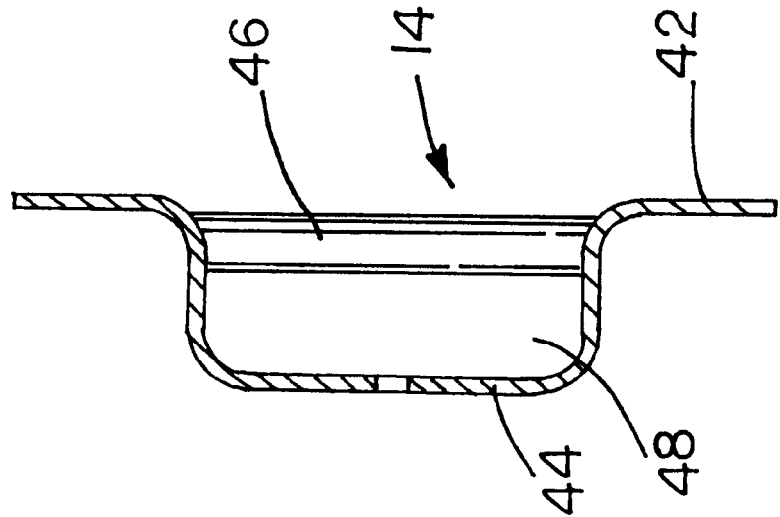
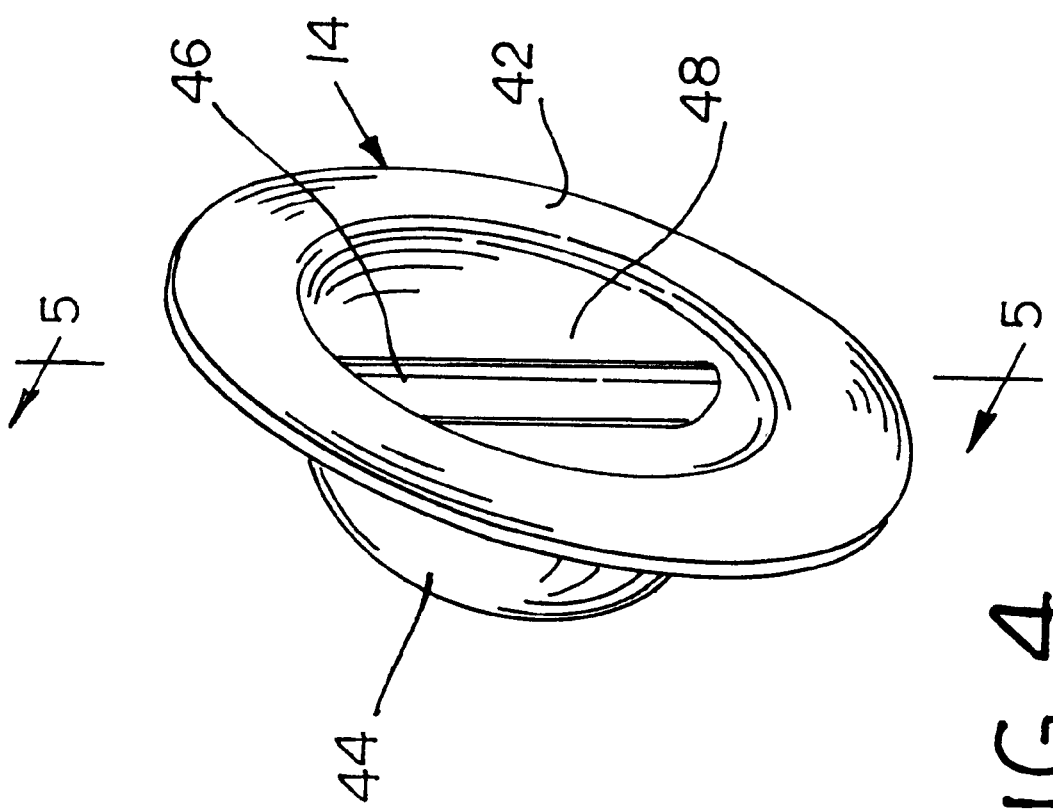

LOAD LOCK RACK

FIELD OF THE INVENTION

The present invention is generally directed to accessories for semi-trailers and, more particularly, a rack for load locks that can be mounted in a semitrailer.

BACKGROUND OF THE INVENTION

Over the years, there has been a growing dependency on the trucking industry to transport goods. This has resulted in development of more powerful and sophisticated tractors and associated trailers as well as accessories that facilitate the tasks of loading, transporting, and unloading goods when they reach their intended destination. In some instances, the development of accessories has led to the creation of problems that were previously unknown.

As but one example, load locks have been developed for securing a partial load in place during transport. A load lock comprises an adjustable length shaft having an integral bearing pad on each of opposite ends thereof. Typically, a plurality of load locks will be utilized to secure a partial load in a semi-trailer.

Depending upon the size of the cartons or goods that are being hauled in a semi-trailer, there will be one or more load locks positioned vertically and one or more load locks positioned horizontally. They are usually placed in contact with, or in close proximity to, the rearward-most cartons or goods so as to extend between the floor and the roof of the semi-trailer, i.e., vertically, as well as between the side walls of the semi-trailer, i.e., horizontally. By utilizing an adjustment mechanism associated with the shaft of the load lock, the bearing pads may be placed in tight interference fit with the respective ones of floor and roof or the side walls.

When the semi-trailer is to be unloaded, the load locks are released from their position of use within the semi-trailer. It is common for them to be laid on the floor of the semi-trailer or, alternatively, placed on the loading dock while the semi-trailer is unloaded. In either case, there is a reasonable likelihood that the load locks will either be damaged or lost in the course of unloading the semi-trailer.

For instance, if the load locks are placed on the floor of the semi-trailer, they may well be damaged by a forklift being utilized to facilitate the unloading process. The shaft, bearing pads, and/or adjustment mechanism typically cannot withstand the weight of a loaded forklift without being damaged, or possibly even destroyed. When this occurs, the load locks must be replaced, which means they may not be available when needed, and the replacement cost is a significant factor in operating costs.

Similarly, if the load locks are placed on the loading dock, they may well be left behind when the trucker leaves the area of the loading dock. It is common practice, once the truck is unloaded, for the trucker to pull away from the loading dock to close the tailgate which creates a natural tendency for the load locks to be forgotten. Once again, operating costs are increased to a degree that is undesirable due to the need to replace load locks that have been left behind.

The present invention is directed to overcoming one or more of the foregoing problems and achieving one or more of the resulting objects.

SUMMARY OF THE INVENTION

It is therefore a principal object of the invention to provide a load lock rack for supporting one or more load locks in a semi-trailer. It is an additional object of the present invention to provide a load lock rack that is capable of supporting load locks during unloading of a semi-trailer as well as during transport of an unloaded semi-trailer. It is an additional object of the present invention to provide a load lock rack kit that incorporates a tie down for securing the load locks during transport.

Accordingly, the present invention is directed to a load lock rack comprising a generally planar shelf-like supporting surface having a front edge and a rear edge spaced therefrom and having at least one opening extending from the front edge to at least a point generally intermediate the front and rear edges. The opening serves to receive the shaft of a load lock, and it is formed such that a bearing pad on the end of the shaft cannot pass through the opening when the load lock is placed on the rack. Further, the load lock rack is formed so as to include suitable means for mounting the shelf-like supporting surface with the rear edge adjacent the side wall of a semi-trailer, and it is also formed so as to include suitable means for maintaining the load lock on the load lock rack during transport of the semi-trailer.

In an exemplary embodiment, the opening includes a neck portion extending from the front edge toward the rear edge of the shelf-like supporting surface, and the neck portion has a width at least as great as the diameter of the shaft of the load lock. It is also highly advantageous for the mounting means to include an upwardly extending plate generally coextensive and integral with the rear edge of the shelf-like supporting surface to be secured by fasteners to the side wall of the semi-trailer. Additionally, the load lock maintaining means preferably includes an upwardly extending lip formed on the front edge of the shelf-like supporting surface, and the upwardly extending lip preferably has a height at least as great as the thickness of the bearing pad on the load lock.

Still additionally, the load lock maintaining means preferably includes forming the load lock rack such that the front edge of the shelf-like supporting surface is elevated in relation to the rear edge when mounted adjacent the side wall of the semi-trailer. Furthermore, a pair of tie down fittings to be mounted to the side wall of the semi-trailer are advantageously provided wherein the tie down fittings are in horizontally spaced relation below the shelf-like supporting surface to cooperate with a strap extended across the shaft of the load lock.

In a highly preferred embodiment, the shelf-like supporting surface has a plurality of openings each extending from the front edge to at least a point generally intermediate the front and rear edges. The load lock rack is then adapted to support a plurality of load locks inasmuch as each of the openings can receive the shaft of an individual one of the load locks. It is also advantageous for the upwardly extending mounting plate to be disposed generally perpendicular to the shelf-like supporting surface. However, in a most highly preferred embodiment, the upwardly extending mounting plate is disposed at an acute angle to the shelf-like supporting surface, i.e., an angle which is less than 90°.

When a plurality of openings is provided, the openings in the shelf-like supporting surface preferably each include a neck portion, wider than the diameter of a load lock shaft, which extends from the front edge toward the rear edge of the shelf-like supporting surface. With this arrangement, the neck portions of the openings each advantageously extend to a circular-shaped enlarged central opening portion disposed at a point intermediate the front edge and the rear edge of the shelf-like supporting surface. Also, when a plurality of openings is provided, the upwardly extending lip along the front edge of the shelf-like supporting surface preferably comprises a plurality of generally vertical lip portions extending from and between the neck portions of the openings to permit the shafts of load locks to pass therethrough.

In another respect, the present invention is directed to a load lock rack kit for use with a semi-trailer having a floor, a roof, and a side wall extending substantially from the floor to the roof, and the kit comprises a load lock rack and a pair of tie down fittings. The load lock rack includes a generally planar shelf-like supporting surface and means for mounting the shelf-like supporting surface with the rear edge adjacent a side wall of the semi-trailer. It also includes means for maintaining the load lock on the load lock rack during transport of the semi-trailer. The tie down fittings each include a flange to be mounted in contact with the surface of the side wall of the semi-trailer and a body portion to be mounted in recessed relation within the side wall of the semi-trailer. With this arrangement, the pair of tie down fittings are adapted to be mounted below the shelf-like supporting surface in horizontally spaced relation to cooperate with a strap which may be extended across the shaft of the load lock and secured to the tie downs.

Other objects, advantages and features of the present invention will become apparent from a consideration of the following specification taken in conjunction with the accompanying drawings.

BRIEF DESCRIPTION OF THE DRAWINGS

FIG. 4 is an enlarged perspective view showing a load lock tie down fitting for the kit of FIG. 1; and FIG. 5 is a cross-sectional view of the tie down fitting taken generally along the line 5—5 of FIG. 4.

DETAILED DESCRIPTION OF THE PREFERRED EMBODIMENT

Figure 1:
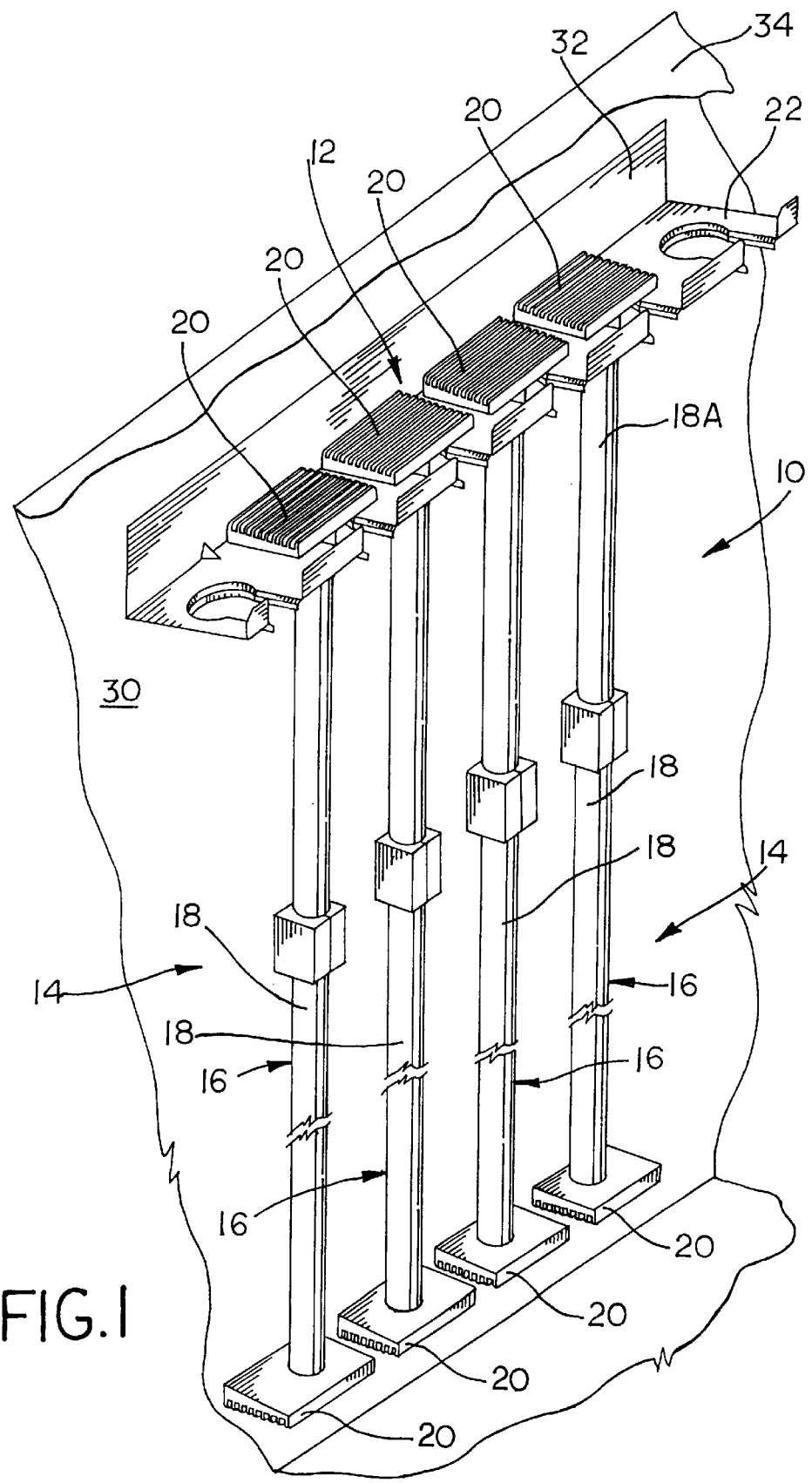
FIG. 1 is a perspective view of a load lock rack kit installed in a side wall of a semi-trailer in accordance with the present invention.
Figure 2:
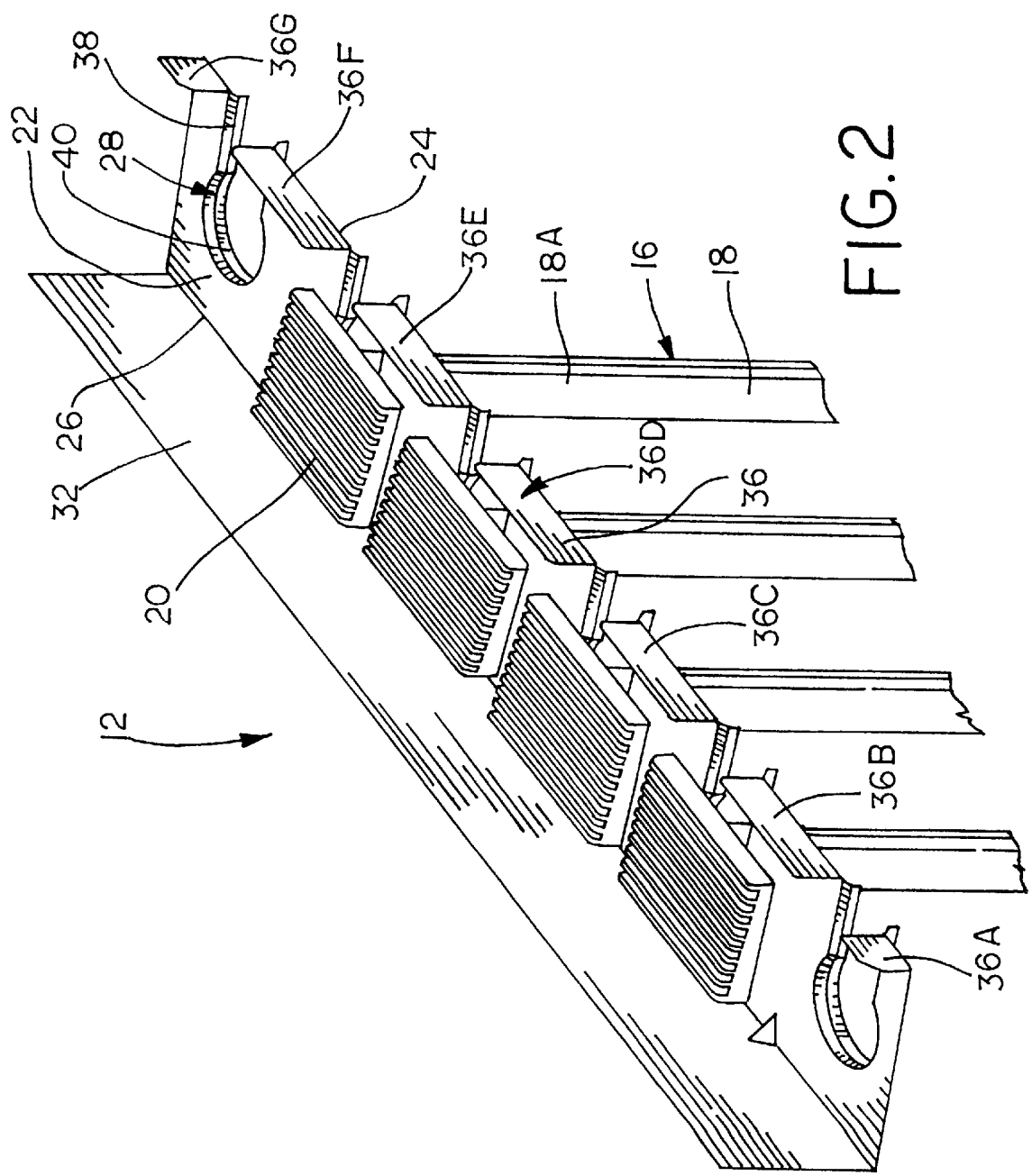
FIG. 2 is an enlarged perspective view illustrating details of the load lock rack for the kit of FIG. 1.
Figure 3:
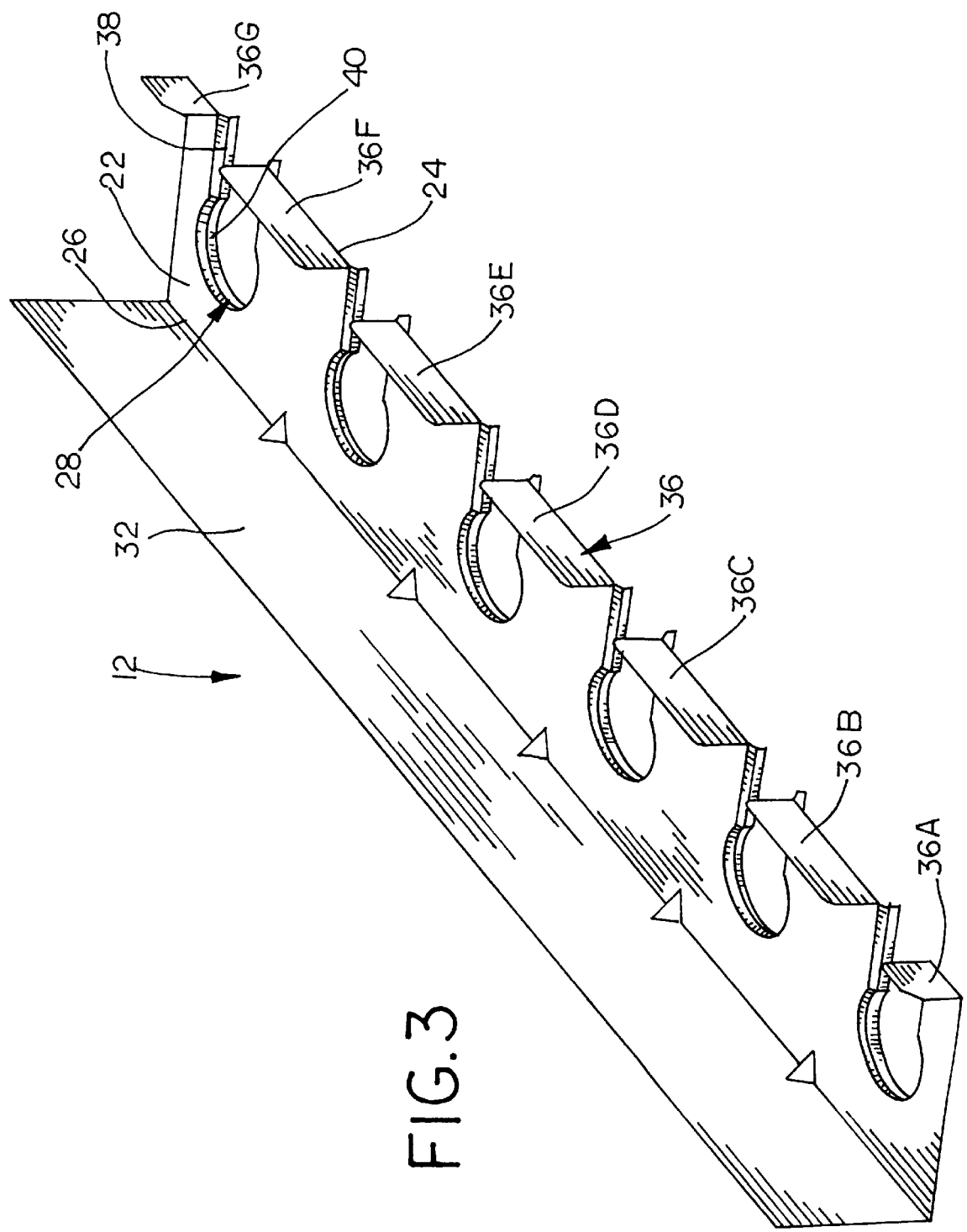
FIG. 3 is an enlarged perspective view, similar to FIG. 2, with the load locks removed from the rack.

In the illustrations given, and with reference first to FIG. 1, the reference numeral 10 designates generally a load lock rack kit in accordance with the present invention. The load lock rack kit 10 includes a load lock rack 12 and a pair of tie down fittings, each of which is designated 14. As will be seen in FIG. 1, the load lock rack 12 is supporting a plurality of load locks 16 having adjustable length shafts 18 and integral bearing pads 20 on each of opposite ends thereof As shown in FIGS. 1–3, the load lock rack 12 includes a generally planar shelf-like supporting surface 22 having a front edge 24 and a rear edge 26 spaced from the front edge 24. The shelf-like supporting surface 22 will be seen to have a plurality of openings, each generally designated 28 and extending from the front edge to at least a point generally intermediate the front and rear edges 24 and 26 to receive the shaft 18 of a load lock 16. As will be appreciated from FIGS. 1 and 2, the openings 28 are each formed such that a bearing pad 20 on at least one end of the shaft 18 of a load lock 16 cannot pass through.

Referring once again to FIGS. 1–3, the load lock rack 12 includes means for mounting the shelf-like supporting surface 22 with the rear edge 26 adjacent a side wall 30 of a semi-trailer. The mounting means includes an upwardly extending plate 32 which is integral with the rear edge 26 of the shelf-like supporting surface 22 and which is adapted to be secured by fasteners (not shown) to the side wall 30 in relatively close proximity to a roof 34 of the semi-trailer. As will be appreciated from FIG. 3, the upwardly extending plate 32 comprising the mounting means is disposed generally perpendicular to the shelf-like supporting surface 22.

With reference now to FIG. 2, the load lock rack 12 includes means for maintaining a load lock 16 on the load lock rack 12 during transport of the semi-trailer when the load lock 16 is positioned on the load lock rack 12 which advantageously takes the form of an upwardly extending lip 36. The lip 36 extends along the front edge 24 of the shelf-like supporting surface 22 and has a height at least as great as the thickness of the bearing pad 20 on a load lock 16. As clearly shown in FIGS. 1 and 2, the lip 36 is comprised of a plurality of generally vertical lip portions 36a–g extending from and between neck portions 38 of the openings 28 in such manner as to permit the shafts 18 of load locks 16 to pass therethrough.

In this connection, the openings 28 each include a neck portion 38 which is wider than the diameter of a load lock shaft 18, and the neck portions 38 each extend from the front edge 24 toward the rear edge 26 of the shelf-like supporting surface 22. It will be appreciated from FIGS. 2 and 3 in particular that the neck portions 38 of the openings 28 each extend to a circular-shaped enlarged central opening portion 40. With this arrangement, the shaft portions 18a can pass through the narrower neck portions 38 with the bearing pads 20 elevated above the upwardly extending lip 36 following which the load locks 16 can be lowered to locate the bearing pads 20 in abutment with the upwardly extending plate 32.

By providing the circular-shaped enlarged central opening portions 40, the load locks 16 are easily located in the positions as best shown in FIGS. 1 and 2, and the load lock rack 12 is capable of supporting any commercially available load lock.

As for other details, the upwardly extending plate 32, which is to be secured to the side wall 30 of a semi-trailer by fasteners, is advantageously disposed at an acute angle to the shelf-like supporting surface 22. Thus, when the upwardly extending plate 32 is secured to the substantially vertical side wall 30 by fasteners or the like, the front edge 24 of the shelf-like supporting surface 22 is elevated in relation to the rear edge 26. With this arrangement, the bearing pads 20 on the load locks 16 will naturally tend to seek a position in contact with the upwardly extending plate 32 substantially as shown in FIGS. 1 and 2.

By reason of the angled shelf-like supporting surface 22 and the lip portions 36a–g, the load locks 16 are maintained on the load lock rack 12 during transport of the semi-trailer, and this can be further facilitated by mounting the load lock rack 12 in relatively close proximity to the roof 34 of the semi-trailer. In this manner, the bearing pads 20 tend to stay confined between the angled shelf-like supporting surface 22 and the roof 34 of the semi-trailer except when it is intended to remove the load locks 16 from the load lock rack 12. In other words, any bouncing of the semi-trailer may cause the load locks 16 to bounce on the load lock rack 12, but the angled shelf-like supporting surface 22, the lip portions 36a–g, and the close proximity of the roof 34 tend to maintain the load locks 16 on the load lock rack 12.

As for the tie down fittings 14, they can be fully understood by reference to FIGS. 1, 4 and 5 which show their structure and function.

As will be seen, the tie down fittings 14 each include a flange 42 adapted to be mounted in contact with a surface of the side wall 30 of the semi-trailer and a body portion 44 to be mounted in recessed relation within the side wall 30 of the semi-trailer. The tie down fittings 14 also each include an integral diametrically extending post 46 spanning a recess 48 which will be understood as defined by the body portion 44. With this arrangement, the tie down fittings 14 may be mounted below the shelf-like supporting surface 22 in horizontally spaced relation to cooperate with a strap extended across the shafts 18 of the load locks 16.

As will now be clear, the present invention is directed to a unique load lock rack for supporting a load lock having an adjustable length of shaft with an integral bearing pad on each of opposite ends thereof. A load lock rack may advantageously be combined with a semi-trailer having a floor, a roof, and a side wall extending substantially from the floor to the roof for the purpose of carrying load locks thereon. In addition, the present invention may be provided as a unique load lock rack kit comprising a load lock rack and a pair of tie down fittings that cooperate to support load locks on the side wall of a semi-trailer even during transport.

In either case, the invention is well suited for use by original equipment manufacturers or for retrofit applications to be installed into existing semi-trailers in order to provide a highly effective and efficient manner of supporting and transporting load locks when they are not being utilized to restrain a partial load within a semi-trailer.

While in the foregoing there has been set forth a preferred embodiment of the invention, it will be appreciated that the details herein given may be varied by those skilled in the art without departing from the true spirit and scope of the appended claims.

I claim:

1. In combination, a load hauling transport having a floor, a roof, and a side wall extending substantially from said floor to said roof, and a load lock rack for supporting a load lock having an adjustable length shaft with an integral bearing pad on each of opposite ends thereof, the load lock rack comprising:

a generally planar and horizontal shelf-like supporting surface having a front edge and a rear edge spaced therefrom, said shelf-like supporting surface having at least one opening extending from said front edge to at least a point generally intermediate said front and rear edges to receive the shaft of said load lock in a generally vertical orientation, said opening being formed such that the bearing pad on at least one end of the shaft cannot pass through said opening;

means for mounting said shelf-like supporting surface such that said rear edge is adjacent the side wall of the load hauling transport; and means for maintaining the load lock on said load lock rack during movement of the load hauling transport when the load lock is positioned on said load lock rack.

2. The combination of claim 1 wherein said opening includes a neck portion extending from said front edge toward said rear edge of said shelf-like supporting surface and having a width at least as great as the diameter of the shaft of the load lock.

3. The combination of claim 1 wherein said load lock maintaining means includes an upwardly extending lip on said front edge of said shelf-like supporting surface and having a height at least as great as the thickness of the bearing pad on the load lock.

4. The combination of claim 1 wherein said mounting means includes an upwardly extending plate generally coextensive and integral with said rear edge of said shelf-like supporting surface to be secured by fasteners to the side wall.

5. The combination of claim 1 wherein said maintaining means includes forming said load lock rack such that said front edge of said shelf-like surface is elevated in relation to said rear edge when mounted adjacent the side wall.

6. The combination of claim 1 including a pair of tie down fittings to be mounted to the side wall in horizontally spaced relation below said shelf-like supporting surface to cooperate with a strap extended across the shaft of the load lock.

* * * * *